US010659848B1

(12) United States Patent
Baughman et al.

(10) Patent No.: US 10,659,848 B1
(45) Date of Patent: May 19, 2020

(54) DISPLAY OVERLAYS FOR PRIORITIZATION OF VIDEO SUBJECTS

(71) Applicant: International Business Machines Corporation, Armonk, NY (US)

(72) Inventors: Aaron K. Baughman, Cary, NC (US); Gray Cannon, Miami, FL (US); Christopher Eythan Holladay, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/360,384

(22) Filed: Mar. 21, 2019

(51) Int. Cl.
*H04N 21/81* (2011.01)
*H04N 5/225* (2006.01)
*G06K 9/00* (2006.01)
*G06K 9/32* (2006.01)

(52) U.S. Cl.
CPC ..... *H04N 21/8133* (2013.01); *G06K 9/00369* (2013.01); *G06K 9/00724* (2013.01); *G06K 9/3233* (2013.01); *H04N 5/2252* (2013.01)

(58) Field of Classification Search
CPC .............. H04N 5/2252; H04N 21/8133; G06F 9/00369; G06F 9/00724; G06F 9/3233
See application file for complete search history.

(56) References Cited

U.S. PATENT DOCUMENTS

| 5,111,516 | A | 5/1992 | Nakano |
| 6,046,766 | A | 4/2000 | Sakata |
| 6,847,336 | B1 | 1/2005 | Lemelson |
| 6,882,741 | B2 | 4/2005 | Dobashi |
| 7,886,003 | B2 | 2/2011 | Newnam |
| 2002/0133562 | A1 | 9/2002 | Newnam |
| 2004/0175169 | A1* | 9/2004 | Azuma ............... H04N 1/32128 396/310 |
| 2006/0121993 | A1 | 6/2006 | Scales |
| 2010/0124274 | A1 | 5/2010 | Cheok |
| 2011/0063446 | A1 | 3/2011 | McMordie |
| 2011/0216179 | A1* | 9/2011 | Dialameh ............... A61H 3/061 348/62 |
| 2014/0266988 | A1 | 9/2014 | Fisher |
| 2014/0369595 | A1 | 12/2014 | Pavlidis |
| 2015/0085111 | A1 | 3/2015 | Lavery |
| 2015/0326932 | A1* | 11/2015 | Hill ..................... H04N 21/4312 725/32 |
| 2015/0341599 | A1 | 11/2015 | Carey |
| 2018/0220078 | A1* | 8/2018 | Watanabe ........ H04N 5/232941 |
| 2018/0262659 | A1* | 9/2018 | Hegde .................... H04N 5/232 |
| 2018/0270441 | A1 | 9/2018 | Van Geel |
| 2019/0043218 | A1* | 2/2019 | Hiltner ............... H04N 5/23219 |

FOREIGN PATENT DOCUMENTS

WO 02073925 A2 9/2002

* cited by examiner

*Primary Examiner* — Dominic D Saltarelli
(74) *Attorney, Agent, or Firm* — David B. Woycechowsky

(57) ABSTRACT

Technology for generating camera viewfinder displays for camera people video recording/broadcasting live events such as sporting events, where the viewfinder displays include overlays that include: (i) priority values for objects shown on and/or off the live event view shown in viewfinder display; (ii) identifications of objects that are outside the viewfinder display; and/or (iii) direction to the locations of objects that are outside the viewfinder display. In response to these indications in the overlay, the cameraperson may move the camera to better capture a high priority object and/or capture an object that was outside the viewfinder display.

20 Claims, 6 Drawing Sheets

DISPLAY OVERLAYS FOR PRIORITIZATION OF VIDEO SUBJECTS

BACKGROUND

The present invention relates generally to the field of video cameras, and more particularly to displays for video cameras.

In currently conventional video cameras: (i) overlays in the viewport or field monitor pertain to image characteristics (as opposed to real world subject matter shown in the image that is being displayed in the video camera display) such as lighting; (ii) as an example of overlay data, currently conventional video cameras can overlay zebra stripes that fade as the operator corrects for lighting; and (iii) the "tally" is a light on the video camera that indicates whether the operating camera is live, soon to be live (preview), or neither.

SUMMARY

According to an aspect of the present invention, there is a method, computer program product and/or system that performs the following operations (not necessarily in the following order): (a) receiving, from a first camera device, a narrow frame video data set including data indicative of a first view of a real world live event; (b) receiving, from a second camera device, a wide frame video data set including data indicative of a second view of a real world live event, with the second view including: (i) substantially all of what is visible in the first view, and (ii) additional viewing area that is not visible in the first view; (c) identifying, by machine logic, a set of out-of-narrow-frame object(s) of potential interest that are visible in the additional viewing area but not visible in the first view so that each out-of-narrow-frame object has human understandable identification text respectively assigned to it; (d) generating an overlay data set including information indicative of the identification text for each out-of-narrow-frame object of the set of out-of-narrow-frame object(s); and (e) sending the overlay data set to the first camera device for display on a display of the first camera device as an overlay overlaid on the first view.

According to a further aspect of the present invention, there is a method, computer program product and/or system that performs the following operations (not necessarily in the following order): (a) receiving, from a first camera device, a video data set including data indicative of a first view of a real world live event; (b) identifying, by machine logic, a set of in-narrow-frame object(s) of potential interest that are visible in the first view so that each in-narrow-frame object has human understandable identification text respectively assigned to it; (c) for each in-narrow-frame object of the set of in-narrow-frame object(s), determining, by machine logic, a respective priority value; (d) generating an overlay data set including information indicative of: (i) the identification text for each in-narrow-frame object of the set of in-narrow-frame object(s), and (ii) the priority value for each in-narrow-frame object of the set of in-narrow-frame object(s); and (e) sending the overlay data set to the first camera device for display on a display of the first camera device as an overlay overlaid on the first view.

According to a further aspect of the present invention, there is a method, computer program product and/or system that performs the following operations (not necessarily in the following order): (a) receiving, from a first camera device, a narrow frame video data set including data indicative of a first view of a real world live event; (b) receiving, from a second camera device, a wide frame video data set including data indicative of a second view of a real world live event, with the second view including: (i) substantially all of what is visible in the first view, and (ii) additional viewing area that is not visible in the first view; (c) identifying, by machine logic, a set of out-of-narrow-frame object(s) of potential interest that are visible in the additional viewing area but not visible in the first view so that each out-of-narrow-frame object has human understandable identification text respectively assigned to it; (d) identifying, by machine logic, a set of in-narrow-frame object(s) of potential interest that are visible in the first view so that each in-narrow-frame object has human understandable identification text respectively assigned to it; (e) for each in-narrow-frame object of the set of in-narrow-frame object(s), determining, by machine logic, a respective priority value; (f) generating an overlay data set including information indicative of: (i) the identification text for each in-narrow-frame object of the set of in-narrow-frame object(s), (ii) the priority value for each in-narrow-frame object of the set of in-narrow-frame object(s), and (iii) the identification text for each out-of-narrow-frame object of the set of out-of-narrow-frame object(s); and (g) sending the overlay data set to the first camera device for display on a display of the first camera device as an overlay overlaid on the first view.

DETAILED DESCRIPTION

Figure 1:
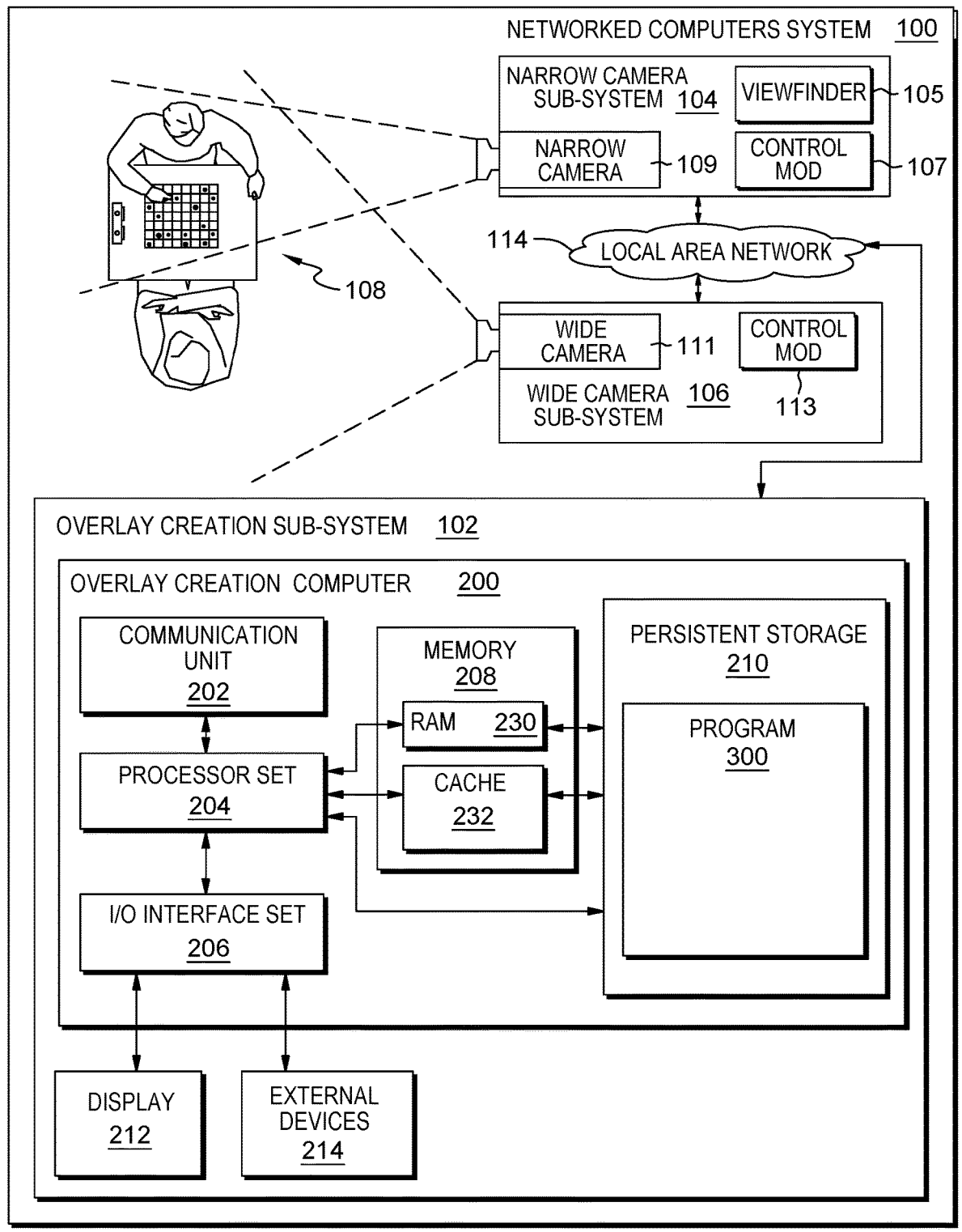
FIG. 1 is a block diagram view of a first embodiment of a system according to the present invention.

Some embodiments of the present invention are directed to generating camera viewfinder displays for camera people video recording/broadcasting live events such as sporting events, where the viewfinder displays include overlays that include: (i) priority values for objects shown on and/or off the live event view shown in viewfinder display; (ii) identifications of objects that are outside the viewfinder display; and/or (iii) direction to the locations of objects that are outside the viewfinder display. In response to these indications in the overlay, the cameraperson may move the camera to better capture a high priority object and/or capture an object that was outside the viewfinder display.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram showing: networked computers system 100 and chess match 108. Networked computers system 100 includes: overlay creation sub-system 102; narrow camera sub-system 104 (which is a professional digital video camera with a built in computer processor); wide camera sub-system 106 (which is a professional digital video camera with a built in computer processor); and local area network (LAN) 114. Sub-system 102 includes: overlay creation computer 200; communication unit 202; processor set 204; input/output (I/O) interface set 206; memory device 208; persistent storage device 210; display device 212; external device set 214; random access memory (RAM) devices 230; cache memory device 232; and program 300. Narrow camera sub-system 104 includes: viewfinder 105; control module ("mod") 107; and narrow camera 109. Wide camera sub-system 106 includes: control module ("mod") 113; and wide camera 111.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
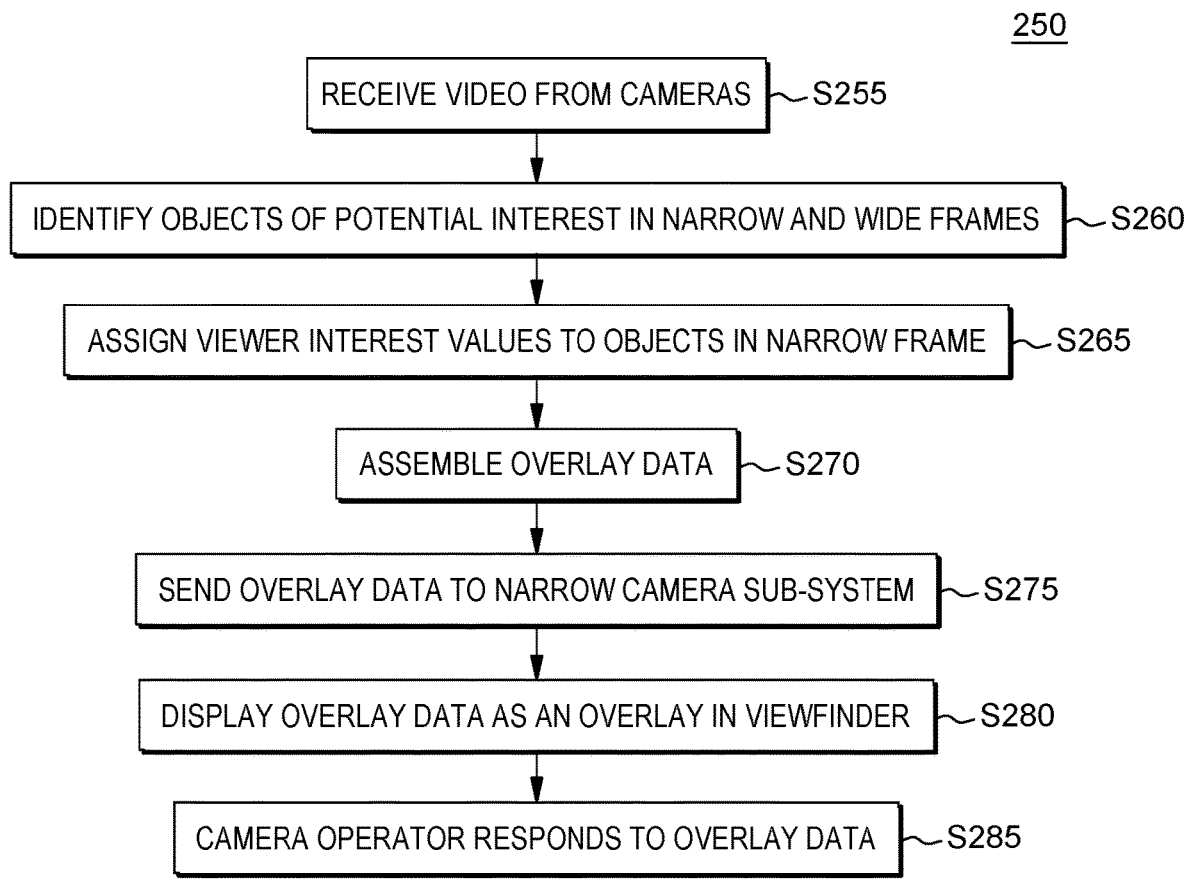
FIG. 2 is a flowchart showing a first embodiment method performed, at least in part, by the first embodiment system.
Figure 3:
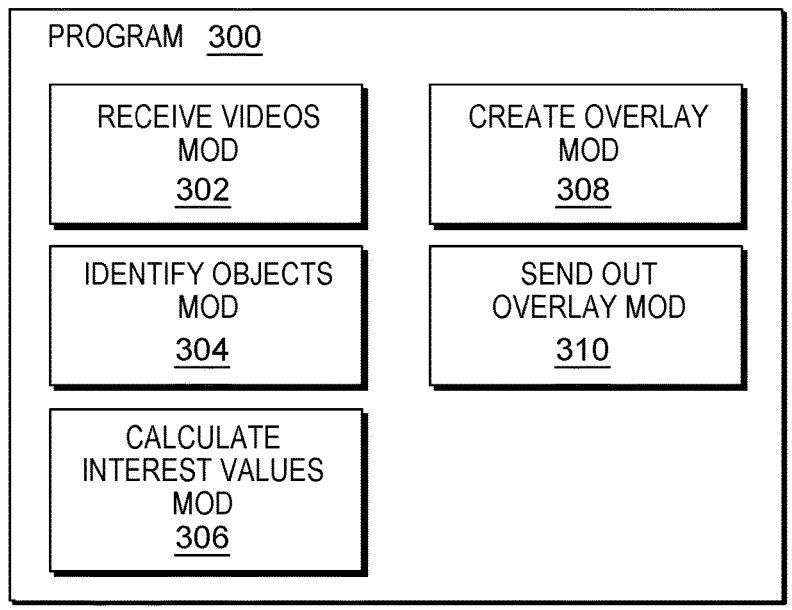
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where narrow camera sub-system 104 and wide camera sub-system send their respective video signals (made up of video frames) to receive videos mod 302 of program 300 of overlay creation sub-system 102 (see FIG. 1). In this example, the live even being capture, simultaneously, by the two video cameras, is a chess match between Abel and Baker. As shown in FIG. 1: (i) narrow camera 109 of narrow camera sub-system 104 is configured to capture a relatively narrow frame of view (which narrowness of frame of view is shown in viewfinder screen shot 402 of FIG. 4); and (ii) wide camera 111 of wide camera sub-system 106 is configured to capture a relatively wide frame of view.

In this example, the narrow and wide cameras have separate and distinct camera points and focal points that are widely spaced apart. This example was chosen that way largely to help make the drawings easier to understand and the basic concepts. Alternatively, in other embodiments, wide and narrow cameras may share much of their hardware and have focal points that are close to each other, or even identical. For example, the same image capturing hardware could be used in the wide camera and the narrow camera, with the wide and narrow cameras only being distinguished by the fact that the narrow camera crops a larger image that is the image of the wide camera. In the parlance of this document, that is considered as two cameras, even though a layperson would typically, colloquially refer to this as a single camera that simultaneously produces two images.

Figure 4:
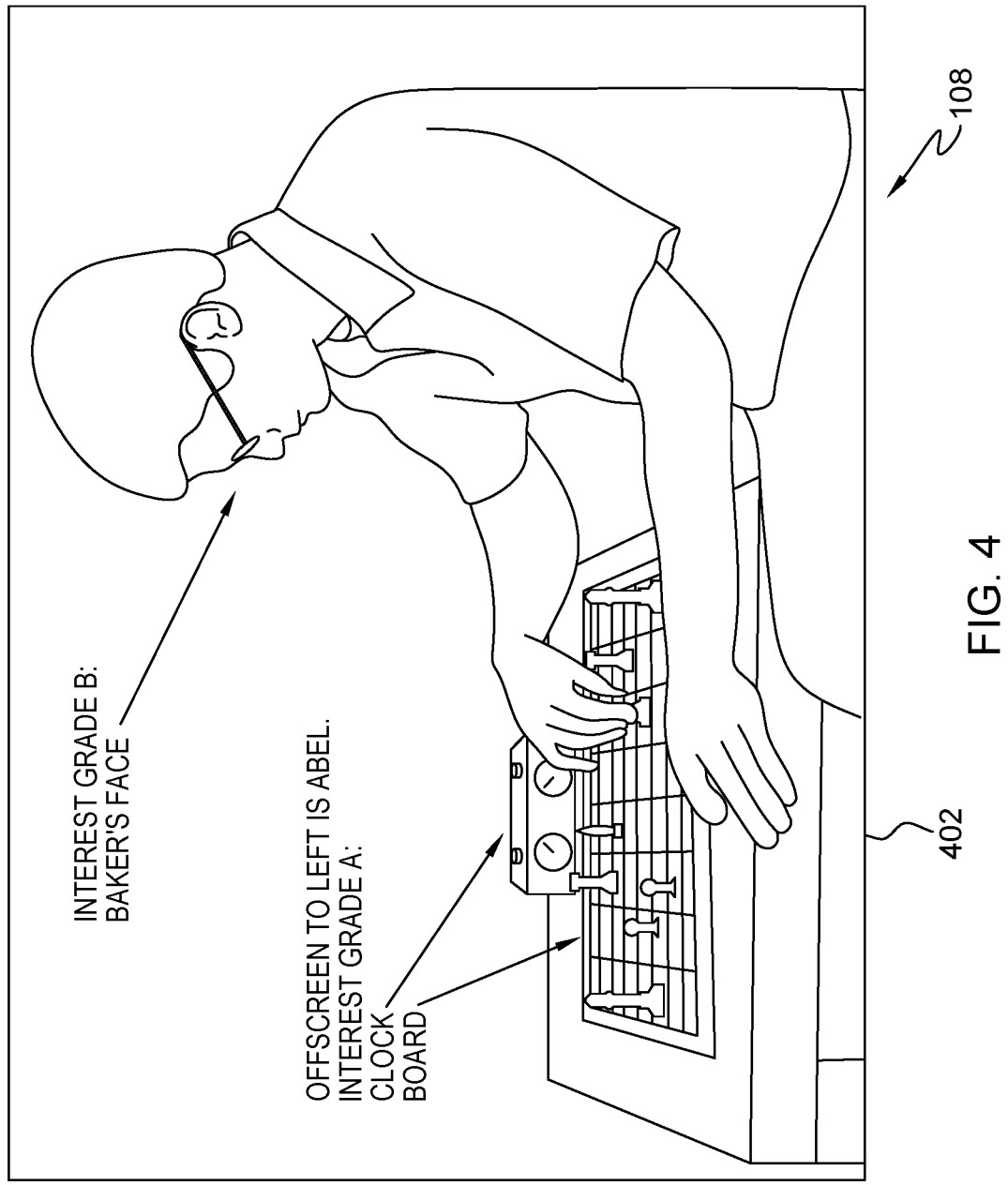
FIG. 4 is a first screenshot view generated by the first embodiment system.

Processing proceeds to operation, S260, where identify objects mod 304 identifies all of the objects of potential interest (for example, people) within the video data received from the narrow and wide cameras at operation S255. In this example, and as shown in FIGS. 1 and 4, these objects of potential interest are: chess player Abel (shown only in the wide shot); chess player Baker; a chess clock and a chess board with an active chess match being played upon it. The next sub-section of this Detailed Description section has further Details about how computers can be used to identify objects of potential interest that are visible in the video of video signal(s).

Processing proceeds to operation S265, where calculate interest values mod 306 assigns viewer interest values to objects in the narrow frames received from the narrow camera. "Interest values" are one type of "priority values." "Priority values" are any values that rank objects based upon how important they are to a cameraperson covering a live event. Different types of live events will typically have different types of factors that feed into the calculation of a priority value. In this example, the interest values are limited to considering how interesting a given object is to a chess viewer. For example, the chess board is considered as interesting to chess enthusiast viewers. However, imagine a cameraperson covering the live event that is a piano concerto in a public park—in that example, the presence of a chessboard in the park would have relatively little interest to the typical concerto viewer. Even beyond expected viewer interest, other factors may feed into the calculation of priority values, such as the required coverage of corporate logos discussed in the following sub-section of this Detailed Description section.

In this example, only objects visible in the narrow frame are assigned priority values. Alternatively, all objects of interest in both the narrow and wide frames may be assigned priority values.

In this example, two different objects may be given the same priority ranking. Alternatively, priority rankings may be calculated so that no two objects are assigned equal priority values.

Processing proceeds to operation S270, where create overlay mod 308 assembles an overlay data set to provide information indicative of: (i) objects of interest that are just offscreen (that is, in the wide frame, but not yet in the narrow frame); and (ii) priority values determined at operation S265. Alternatively, some embodiments of the present invention may provide only one of these two types of overlay information. As a further alternative, some embodiments of the present invention may additionally provide for other types of overlay information.

Processing proceeds to operation S275, where send out overlay mod 310 sends the overlay data set to control mod 107 of narrow camera sub-system 104 through LAN 114 (see FIG. 1).

Processing proceeds to operation S280, where screen shot 402 of chess match 108 is shown on viewfinder 105 (see FIGS. 1 and 4). As can readily be seen in screen shot 402: (i) the chess board and chess clock both have a priority value of A (highest priority); (ii) Baker's face has a priority value of B; and (ii) Abel is offscreen to the left of the narrow frame. This information helps the cameraperson which alternative strategy to use to proceed to the next shot. In this example, such strategies include: (i) panning the camera left to see Abel's face; (ii) zooming in to a close up of the chess board; (iii) zooming in to a close up of the chess clock; (iv) doing a medium shot of the chess board and clock; or (v) zooming in to a close up of Baker's face.

Processing proceeds to operation S285, where the camera operator responds to the overlay data shown on her viewfinder in operation S280. More specifically, in this example, the cameraperson (who has more experience shooting tennis matches than chess matches) had been planning to shift to a close up of Baker's face, but the machine logic of program 300 has determined that the board and clock would be more interesting to chess enthusiast viewers, so the cameraperson instead opts for a medium shot that captures both the chess board and the chess clock, but not the faces of either player. Although not shown in flowchart 250, at this point processing may loop back to operation S255 as the chess match continues and develops.

III. Further Comments and/or Embodiments

Some embodiments of the present invention recognize one, or more, of the following facts, potential problems and/or potential areas for improvement with respect to the current state of the art: (i) live events with video coverage seek to provide their audience with the best content while also highlighting their sponsors; (ii) for high profile events, a technical director is responsible for meeting these goals; (iii) the technical director's role is to instruct the camera operator(s) on what to record; (iv) the technical director must constantly provide clear direction to each camera operator to ensure that the correct subjects are being filmed at just the right time; (v) the difficulty of this job is magnified when there are many camera operators to direct; (vi) effective direction requires tremendous knowledge of the subject matter in addition to direction skill; (vii) broadcasters have different personalities and interests; (viii) depending on the broadcaster personality, a person might have an affinity towards a certain action; (ix) the generated text from video that is translated into slang and personal styles that each broadcaster would say; and/or (x) as a result, the director can get an idea of what the broadcasters will say with a particular scene.

Some embodiments of the present invention may include one, or more, of the following features, characteristics and/or advantages: (i) head-up display overlays within video camera viewport for prioritization of video subjects using digital analytics and character based natural language generation; (ii) employs visual recognition technology and video data sources to provide head-up overlays onto the electronic viewfinder and field monitor of a video camera; (iii) the video camera operator is presented with this information as she is filming, so she can focus on high value video subjects; (iv) provides image to text natural language generation so the video the video producer can gain ideas about what broadcasters will say before panning cameras or directing a cut; (v) creates automatic text that is translated to match the personality of the broadcasters; (vi) identifies the objects in the camera operator's view and presents these labels in the display; (vii) subject labels are queried against data sources, such as web analytics and social media analytics, to provide prioritization; and/or (viii) utilizes a secondary, ultra-wide angle camera on the camera operator's device specifically for the purpose of identifying subjects and providing cues to the operator.

Some embodiments of the present invention may include one, or more, of the following features, characteristics and/or advantages: (i) provides "automated technical direction" because the overlays on the camera operator's view provide direction; (ii) this assistance simplifies both the job of technical director and the job of camera operator; (iii) the provided data also lessens the need for deep subject matter expertise, so skilled directors may work across domains; and/or (iv) the overall production is enhanced by ensuring that high value video subjects are captured at the correct time.

Some embodiments of the present invention may include one, or more, of the following features, characteristics and/or advantages: (i) secondary camera on camera operator's device captures video footage to be analyzed by video recognition software; (ii) video recognition software identifies video subjects; (iii) identified logos are prioritized according to pre-determined goals for frequency; (iv) identified people are prioritized according to relative popularity on owned digital platforms and/or social media; (v) video subject labels and prioritization are provided in the head-up display, overlaid onto the image in the electronic viewfinder and field monitor; and/or (vi) convert image scenes into natural text while translating the text into indigenous broadcaster language.

Some embodiments of the present invention may include one, or more, of the following features, characteristics and/or advantages: (i) use web analytics and/or social media analytics to prioritize video subjects and presenting this information in a head-up display within the camera operator's view; (ii) use a second camera for the detection of high value subjects and for presenting cues via the head-up display; (iii) translation of scene points into broadcaster character specific domain language; and/or (iv) sequential scene epicenter stitching based on automatic specific domain language, excitement scores and visual cues.

In connection with the head-up display overlays within video camera viewport for prioritization of video subjects using digital analytics according to some embodiments of the present invention, the term "augmented reality" describes embodiments where the camera operator's experience of the real world through the viewfinder is augmented by digital data overlays.

In some embodiments of the present invention, the system components may include the following: (i) camera operator, that is person who operates the video camera; (ii) technical director, that is the person who instructs the camera operator(s) on what to record; (iii) main camera, that is the camera recording footage for the video production; (iv) secondary camera, that is, ultra-wide angle camera used for the identification of video subjects; (v) video subjects, that is potential items to be filmed in the video production, may include people, objects and/or brand logos; (vi) head-up display, that is, overlays providing labels, prioritization and/or data concerning the video subjects; (vii) visual recognition technology software, that is software trained to identify video subjects within video footage; and (viii) web analytics, that is data that comes from website usage, which can be useful for prioritizing the audience's interest in various subjects.

Figure 5:
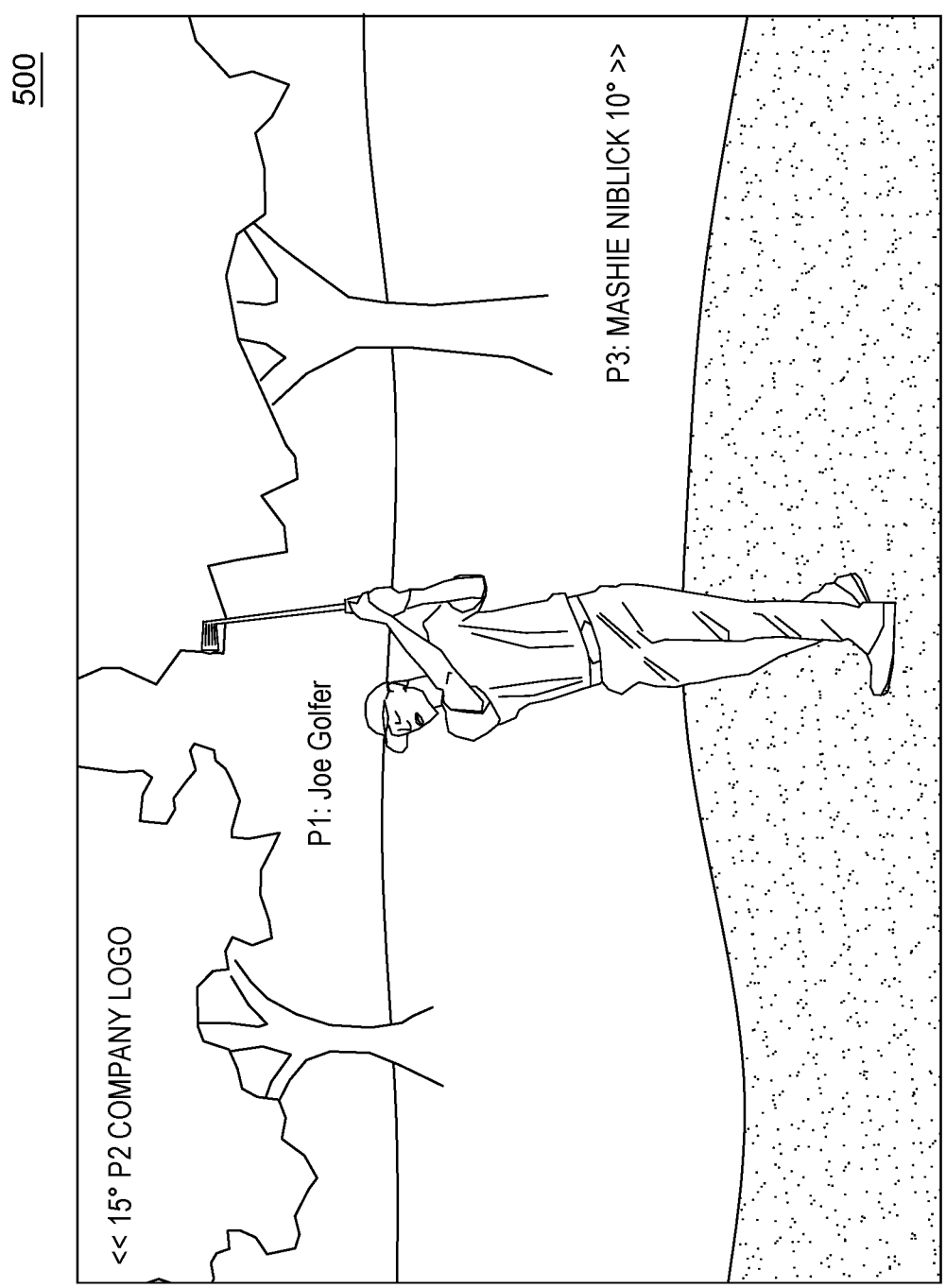
FIG. 5 is a second screenshot view generated by a second embodiment of a system according to the present invention.

With respect to item (vi) on the list in the preceding paragraph, the head-up display is also sometimes referred to as a "viewfinder/field monitor head-up display," as an example of a viewfinder/field monitor head-up display is shown in screen shot 500 of FIG. 5. In this example, an embodiment of the present invention provides three AR captions: (i) P1: Joe Golfer (indicating that the person underneath the caption has been recognized by machine logic as a person named "Joe Golfer" and that he is the object in the screenshot with the highest priority level; (ii)<<15 degrees: Company Logo (indicating that the object having the second highest priority is a Company Logo, off screen by 15 degrees to the left of the current camera orientation); and (iii) P3: Mashie Niblick 10 degrees>> (indicating that the object having the third highest priority is another golfer named Mashie Niblick, off screen by 10 degrees to the right of the current camera orientation).

Figure 6:
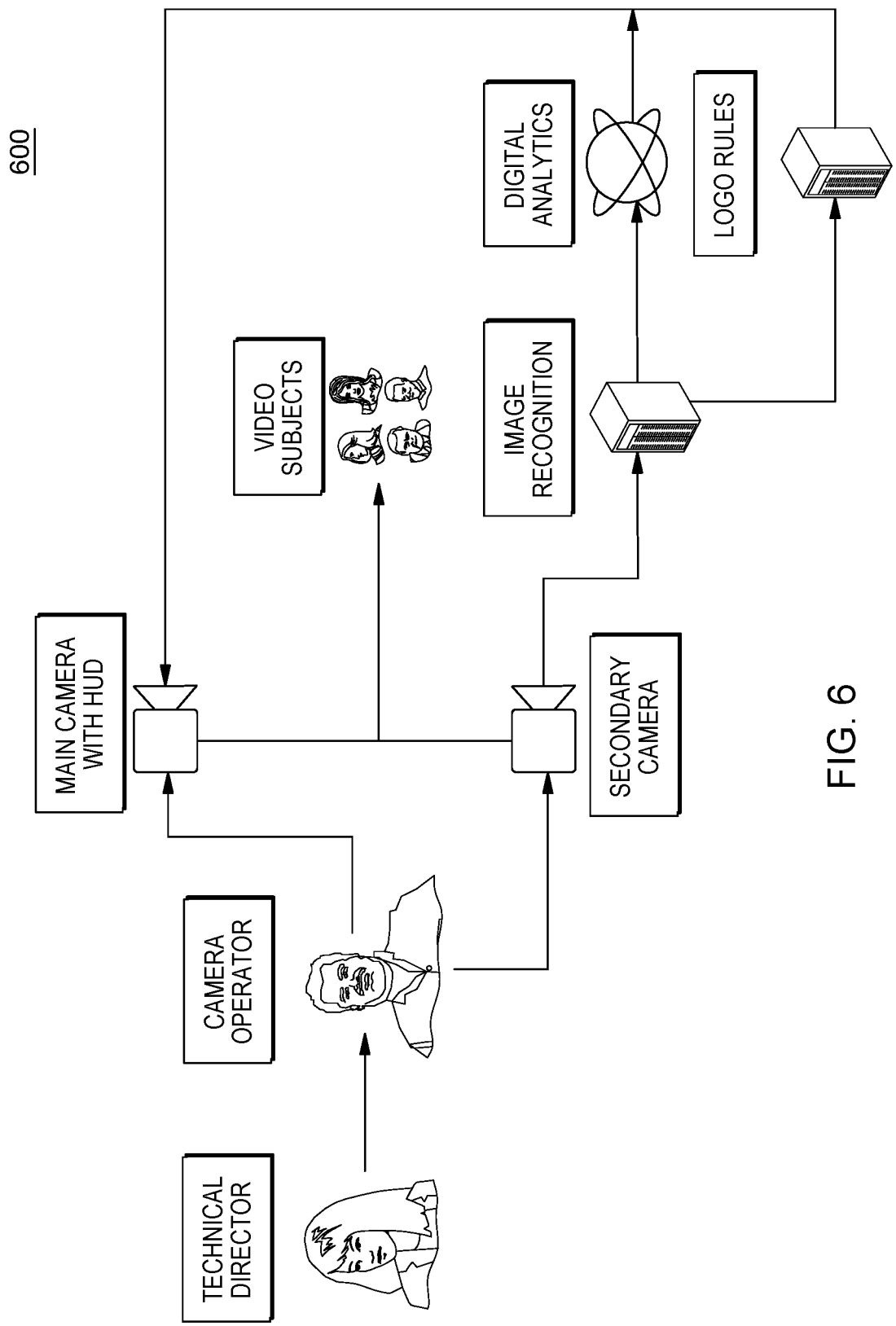
FIG. 6 is a block diagram view of the second embodiment system.

According to an embodiment of the present invention, process flow includes the following: (i) video recognition technology is trained to identify relevant video subjects such as athletes, celebrities and/or brand logos; (ii) technical director inputs desired frequency for showing brand logos in video coverage (for example, show soft drink brand signage at least every 10 minutes); (iii) video camera's main camera is recording live video footage that is used in the video production; (iv) secondary camera (ultra-wide angle) is recording live video solely for video subject identification; (v) video footage from secondary camera is analyzed using visual recognition technology, identifying the people, objects, and sponsored brand logos present in the frame; (vi) the identified items are queried against data sources to assess their priority as video subjects; (vii) a head-up display presents overlays in the camera's electronic viewfinder and field monitor. The overlays denote the identified people and logos and display priority for each; (viii) when the secondary camera identifies high priority subjects outside of the main camera's view, cues indicate the presence of the items and their location relative to the main camera view; and (ix) the camera operator will reposition or refocus the main camera view in order to capture the highest priority subjects. This process flow is shown in block diagram 600 of FIG. 6.

Three (3) potential use cases of various embodiments of the present invention will respectively be discussed in the following three paragraphs.

FIRST USE CASE: camera operator is filming golf but is not a subject matter expert. Operation of an embodiment of the present invention assists her by providing a label indicating the golfer who has been "favorited" by many users on the tournament's mobile application.

SECOND USE CASE: a relatively unknown player is quickly becoming very popular due to a viral video posted on social media. When an embodiment of the present invention queries his name against social media analytics, the high volume of social conversation will cause the player's priority to be increased.

THIRD USE CASE: the production aims to feature a predetermined soft drink brand logo signage every 10 minutes during the broadcast. The system records the timestamp each time the logo is identified within the footage. After 10 minutes have elapsed without a recognition of the logo, the logo becomes the video subject with the top prioritization. The secondary camera recognizes the location of the logo just outside the of the main camera's view. Then, the heads-up display indicates that the logo can be in frame if the operator turns 10 degrees to her right.

Figure 7:
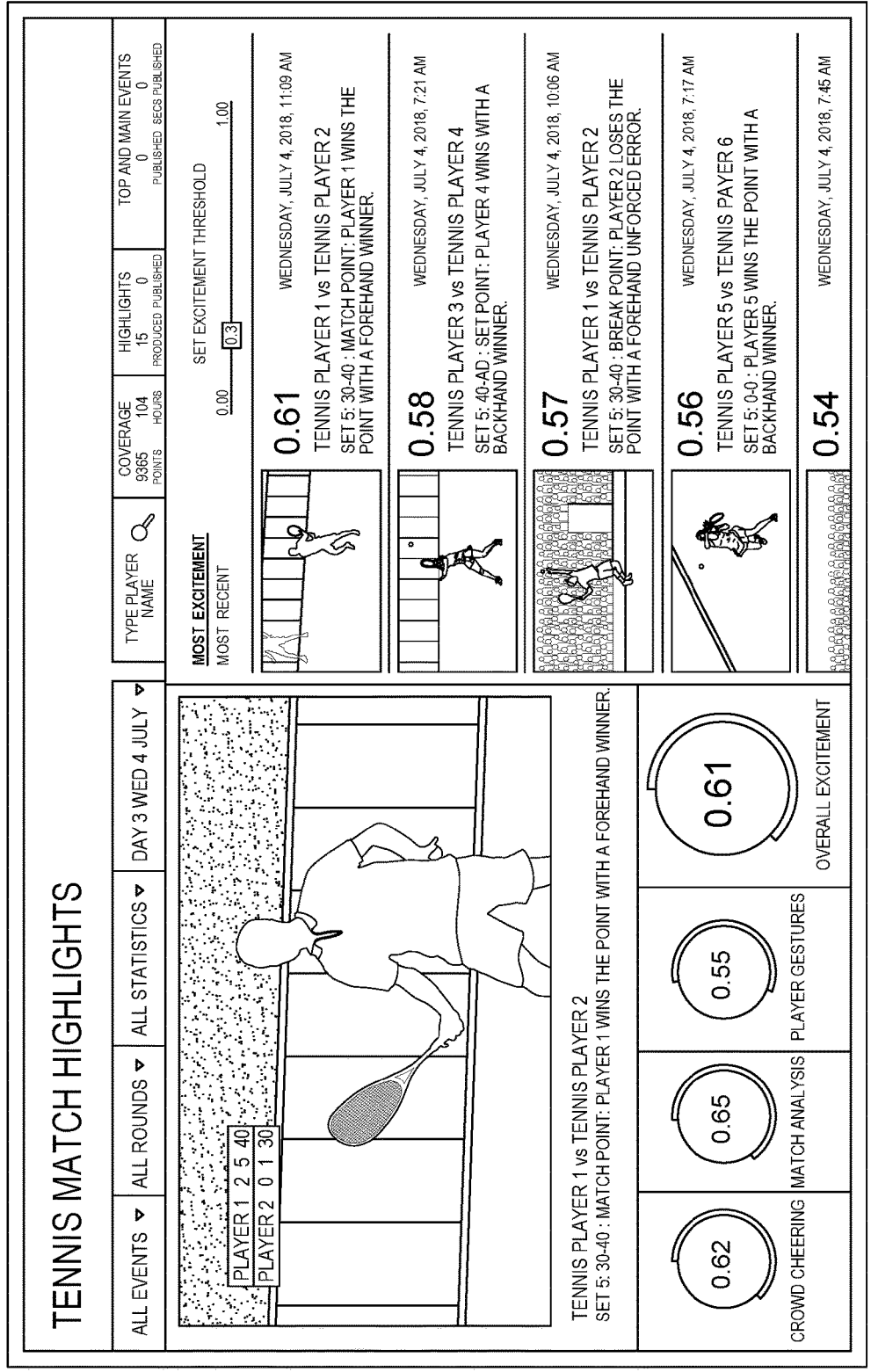
FIG. 7 is a third screenshot view generated by the third embodiment system.

FIG. 7 shows an example screen shot 700 according to an embodiment of the present invention.

The machine logic of the present invention may assign prioritization to objects in, or near, the camera display according to different factors depending upon the context of the event being videoed. For example, in the context of a sporting event, the prioritization typically reflects which video subjects the broadcast values the most at that moment. The prioritization is informed by sponsorship considerations, the expected excitement level of the subject (excitement vector) and digital analytics data (popularity on web, mobile, social). The primary consumer of the prioritization is the camera operator because she will want to focus on the subjects that are the highest priority for the broadcast. The secondary consumer is the technical director who decides what camera feeds are used in the broadcast. The prioritization helps the director make her decision on which feed to select.

The term "web analytics" is used herein to refer to data that is collected from the broadcasting organization's owned digital properties (website, mobile app, TV app, smartwatch app, etc.) Web analytics data is collected by the digital property as users interact with the property. Web analytics are particularly useful in determining feature usage, geolocation, and device characteristics. These elements can also be correlated with one another to discover subsets of users who share characteristics and/or usage patterns. For example, a relevant use of web analytics for a golf tournament live broadcast could be to query the number of page views for various player profiles to infer which players the audience prefers and, therefore, who should be prioritized. This case can be extended by querying only the profile views generated by users located in the specific country for which the video stream is intended. Commonly used web analytics tools include IBM Digital Analytics, Adobe Analytics (AKA Omniture, SiteCatalyst), Google Analytics.

The term "social media analytics" is used herein to refer to two (2) distinct types of social media analytics data that various embodiments of the invention can use: (i) data that pertains to platform-wide social media usage around a particular subject (this is also called "social media listening," and it is useful when an organization wants to respond to a current trend (for example, elevating the prioritization of Joe Golfer as mentions of "Joe Golfer" are increasing platform-wide on a social media site, like Twitter)); and/or (ii) data that pertains only to activity related to the broadcasting organization's owned account. With respect to item (ii) of the foregoing list, this feedback helps organizations determine what type of content is well-received by their audience (for example, elevating the prioritization of Joe Golfer due to a high number of user engagements with a specific photo featuring Joe Golfer that was posted using an official Twitter account belonging to a golf tournament in which Joe Golfer participates. Commonly used social media platforms include Facebook, Twitter, Instagram, Snapchat, and Pinterest.

Currently, video cameras do not consider the relative value among the subjects being recorded. Our invention is a technological advancement because it determines these relative values using digital analytics and makes this information available to camera operators through the head-up display. Further, the introduction of a secondary camera dedicated to identifying high value subjects is a technological advancement. Lastly, generating broadcaster-specific commentary enables the technical director to select the best feeds for the broadcast.

Some embodiments of the present invention may improve computer and video camera capabilities in one, or more, of the following ways: (i) using web analytics and/or social media analytics to prioritize video subjects and presenting this information in a head-up display within the camera operator's viewport; (ii) the use of a second camera for the detection of high value subjects and for presenting cues via the head-up display; (iii) translation of scene points into broadcaster character specific domain language; and/or (iv) sequential scene epicenter stitching based on automatic specific domain language, excitement scores and visual cues.

Some embodiments of the present invention are directed to sequential scene epicenter stitching based on automatic specific domain language, excitement scores and visual cues. Live events with video coverage seek to provide their audience with the best content while also highlighting their sponsors. For high profile events, a technical director is responsible for meeting these goals. The technical director's role is to instruct the camera operator(s) on what to record. The technical director must constantly provide clear direction to each camera operator to ensure that the correct subjects are being filmed at just the right time. Some embodiments of the invention can be seen as "automated technical direction" because the overlays on the camera operator's view provide direction regarding sequential epicenter stitching. This assistance simplifies both the job of technical director and the job of camera operator. The provided data also lessens the need for deep subject matter expertise, so skilled directors may work across domains. Most importantly, the overall production is enhanced by ensuring that high value video subjects are captured at the correct time.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving, from a first camera device, a narrow frame video data set including data indicative of a first view of a real world live event;
   receiving, from a second camera device, a wide frame video data set including data indicative of a second view of a real world live event, with the second view including: (i) substantially all of what is visible in the first view, and (ii) additional viewing area that is not visible in the first view;
   identifying, by machine logic, a set of out-of-narrow-frame object(s) of potential interest that are visible in the additional viewing area but not visible in the first view so that each out-of-narrow-frame object has human understandable identification text respectively assigned to it;
   generating an overlay data set including information indicative of the identification text for each out-of-narrow-frame object of the set of out-of-narrow-frame object(s); and
   sending the overlay data set to the first camera device for display on a display of the first camera device as an overlay overlaid on the first view.

2. The CIM of claim 1 wherein:
   the narrow frame video data set is received from the first camera device over a communication network;
   the wide frame video data set is received from the second camera device over the communication network; and
   the overlay data set is sent to the first camera device over the communication network.

3. The CIM of claim 1 wherein the first camera device and the second camera device are housed in a common camera housing.

4. The CIM of claim 1 wherein the first camera device and the second camera device include and use common image capturing hardware.

5. The CIM of claim 1 further comprising:
   for each given out-of-narrow-frame object of the set of out-of-narrow-frame object(s), determining, by machine logic, a direction between the given out-of-narrow-frame object and a closest point to the given out-of-narrow-frame object and an edge of the first view.

6. The CIM of claim 5 wherein the generation of the overlay data set includes:
   for each given out-of-narrow-frame object of the set of out-of-narrow-frame object(s), placing the information indicative of the identification text for the given out-of-narrow-frame object in a vicinity of the closest point on the edge of the first view to the given out-of-narrow-frame object.

7. The CIM of claim 5 wherein the generation of the overlay data set includes:
   for each given out-of-narrow-frame object of the set of out-of-narrow-frame object(s), including in the overlay data set human understandable information indicative of the direction from the closest point on the edge of the first view to the given out-of-narrow-frame object.

8. The CIM of claim 1 wherein the set of out-of-narrow-frame object(s) includes a corporate logo.

9. The CIM of claim 1 wherein the real world live event is a sporting event.

10. The CIM of claim 9 wherein the set of out-of-narrow-frame object(s) includes a player participating in the sporting event.

11. The CIM of claim 1 further comprising:
    displaying, on the first camera device, the overlay data set as an overlay overlaid on the first view.

12. The CIM of claim 11 further comprising:
    responsive to the display of the overlay data set, moving the first camera so that a first out-of-narrow-frame object appears in the first view.

13. A computer-implemented method (CIM) comprising:
    receiving, from a first camera device, a video data set including data indicative of a first view of a real world live event;
    identifying, by machine logic, a set of in-narrow-frame object(s) of potential interest that are visible in the first view so that each in-narrow-frame object has human understandable identification text respectively assigned to it;
    for each in-narrow-frame object of the set of in-narrow-frame object(s), determining, by machine logic, a respective priority value;
    generating an overlay data set including information indicative of: (i) the identification text for each in-narrow-frame object of the set of in-narrow-frame object(s), and (ii) the priority value for each in-narrow-frame object of the set of in-narrow-frame object(s); and
    sending the overlay data set to the first camera device for display on a display of the first camera device as an overlay overlaid on the first view.

14. The CIM of claim 13 wherein determination of the priority value(s) is based, at least in part, upon relative expected viewer interest in the object(s) of the in-narrow-frame-object(s).

15. The CIM of claim 13 wherein determination of the priority value(s) is based, at least in part, upon contractual obligations to display certain objects.

16. The CIM of claim 13 wherein:
    the real world live event is a sporting event;
    a first in-narrow-frame object of the set of in-narrow-frame object(s) is a player participating in the sporting event; and
    determination of the priority value(s) for the first in-narrow-frame object is based, at least in part, upon an athletic posture of the player.

17. The CIM of claim 13 wherein:
    a first in-narrow-frame object of the set of in-narrow-frame object(s) is a person; and determination of the priority value(s) for the first in-narrow-frame object is based, at least in part, upon emotion displayed by the person.

18. The CIM of claim 13 further comprising:
displaying, on the first camera device, the overlay data set as an overlay overlaid on the first view.

19. The CIM of claim 18 further comprising:
responsive to the display of the overlay data set, moving the first camera based upon the priority value(s).

20. A computer-implemented method (CIM) comprising:
receiving, from a first camera device, a narrow frame video data set including data indicative of a first view of a real world live event;
receiving, from a second camera device, a wide frame video data set including data indicative of a second view of a real world live event, with the second view including: (i) substantially all of what is visible in the first view, and (ii) additional viewing area that is not visible in the first view;
identifying, by machine logic, a set of out-of-narrow-frame object(s) of potential interest that are visible in the additional viewing area but not visible in the first view so that each out-of-narrow-frame object has human understandable identification text respectively assigned to it;
identifying, by machine logic, a set of in-narrow-frame object(s) of potential interest that are visible in the first view so that each in-narrow-frame object has human understandable identification text respectively assigned to it;
for each in-narrow-frame object of the set of in-narrow-frame object(s), determining, by machine logic, a respective priority value;
generating an overlay data set including information indicative of: (i) the identification text for each in-narrow-frame object of the set of in-narrow-frame object(s), (ii) the priority value for each in-narrow-frame object of the set of in-narrow-frame object(s), and (iii) the identification text for each out-of-narrow-frame object of the set of out-of-narrow-frame object(s); and
sending the overlay data set to the first camera device for display on a display of the first camera device as an overlay overlaid on the first view.

* * * * *